E. PONVERT, Jr.
ELECTRICAL WATER-RAISING APPARATUS.
No. 170,014. Patented Nov. 16, 1875.
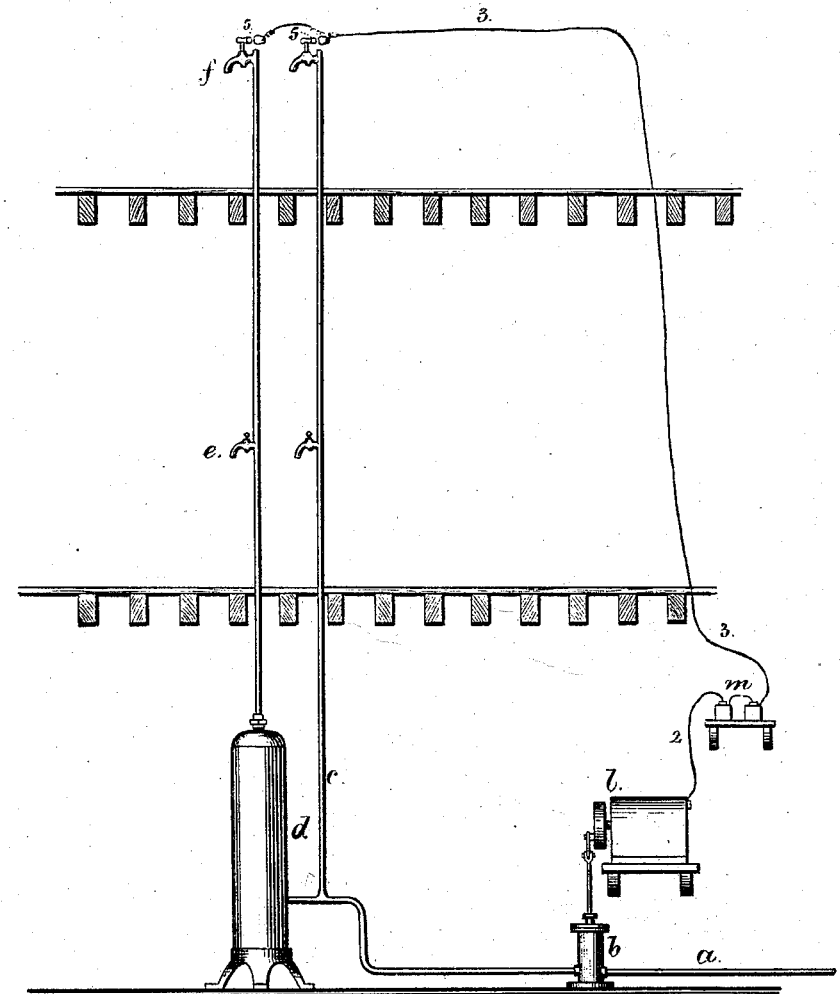

UNITED STATES PATENT OFFICE.

ELIAS PONVERT, JR., OF NEW YORK, N. Y.

IMPROVEMENT IN ELECTRICAL WATER-RAISING APPARATUS.

Specification forming part of Letters Patent No. 170,014, dated November 16, 1875; application filed September 13, 1875.

*To all whom it may concern:*

Be it known that I, ELIAS PONVERT, Jr., of the city and State of New York, have invented an Improvement in Electrical Water-Raising Apparatus, of which the following is a specification:

Pumps for raising water have heretofore been driven by electrical motors; but in such cases it has been necessary to employ a reservoir into which the water is pumped. In many places there is a constant supply of water under a low head, but the same is insufficient to rise to the upper floors of the building.

My improvement is specially available in connection with a supply of water that is sufficient in volume but insufficient in pressure, and relates to an electrical connection applied to a motor, and extended to the upper floors of the building, so that the motor can be started when water is required in such upper floors, and stopped when the requisite quantity has been pumped up. Thereby the battery-power will only be used when necessary, and the person desiring water does not have to go down to the motor to start the same.

In the drawing the connections and pipes are represented, illustrating the mode of applying my said invention. The supply-pipe *a*, from a street-main or other source, passes through the pump *b*, and leads to the rising-pipe *c*, supplying cold water in the building, and it also passes to the hot-water boiler *d*, and thence to the faucets *e f*, that furnish hot water up stairs. The pump is of such a construction that the water can flow through the same and supply the building to the extent of its volume and pressure. The electro-magnetic motor *l* is of any desired construction, and it is connected with the pump, so as to actuate the same. The battery *m* is also connected with the motor, and my improvement especially relates to the peculiarity of the connection. Usually the motor is connected to the battery direct, and a switch is applied contiguous to the motor for stopping and starting the same. I connect one of the poles of the battery to the motor by the wire 2, and from the motor a metallic contact is maintained with the water-pipes through the frame of the motor, or otherwise, and the wire 3, from the other pole of the battery, is passed around the building contiguous to the faucets to which the water will not rise, but requires to be pumped; hence, when water is required at either of these faucets, the circuit is to be closed to the motor. I prefer to make the handle of the faucet with a projection, 5, that comes into contact with the wire 3, or with a spring connected therewith, so that when the handle is turned to open the faucet the circuit will be closed through the wire, faucet, and pipe, and operate the motor. When the water is shut off the circuit is broken and the motor stopped. By this arrangement of circuit it becomes unnecessary to use a reservoir, and the motor is started with facility by closing the circuit adjacent to the faucet from which the water is drawn.

I do not limit myself to any specific circuit-closing device.

I claim as my invention—

In combination with an electric motor-pump and water-distributing pipes, the wire 3 from the battery, and the circuit-closing mechanism adjacent to the respective faucets, for the purposes and substantially as set forth.

Signed by me this 11th day of September, A. D. 1875.

ELIAS PONVERT, JR.

Witnesses:
HAROLD SERRELL,
CHAS. H. SMITH.